May 29, 1962 G. R. SINCLAIR 3,036,795
DECELERATION PARACHUTE RETRACTION SYSTEM
Filed Dec. 5, 1958 8 Sheets-Sheet 1

INVENTOR.
GORDON R. SINCLAIR
BY
ATTORNEYS

May 29, 1962 G. R. SINCLAIR 3,036,795
DECELERATION PARACHUTE RETRACTION SYSTEM
Filed Dec. 5, 1958 8 Sheets-Sheet 3

INVENTOR.
GORDON R. SINCLAIR
BY
ATTORNEYS

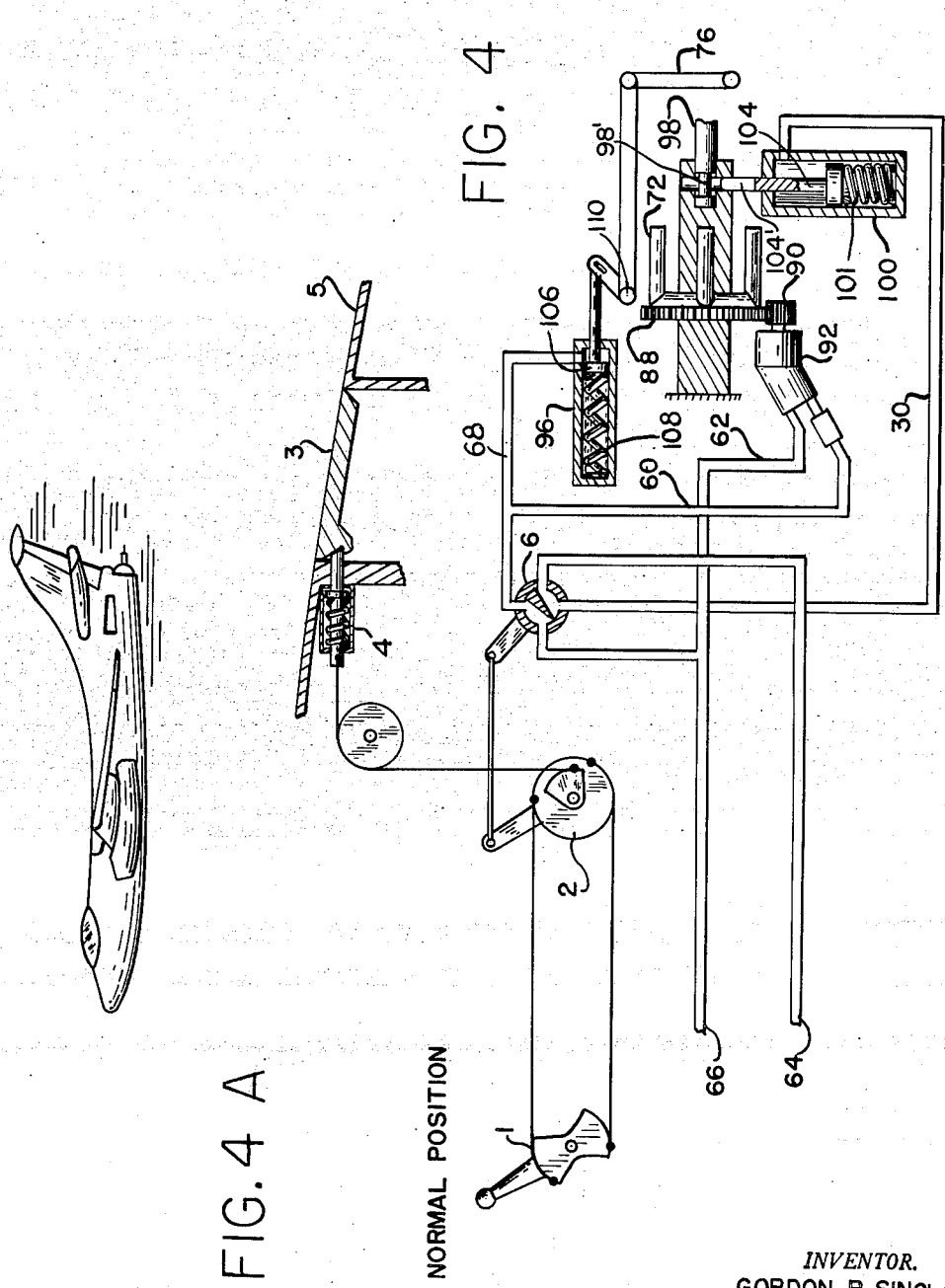

May 29, 1962 G. R. SINCLAIR 3,036,795
DECELERATION PARACHUTE RETRACTION SYSTEM
Filed Dec. 5, 1958 8 Sheets-Sheet 5
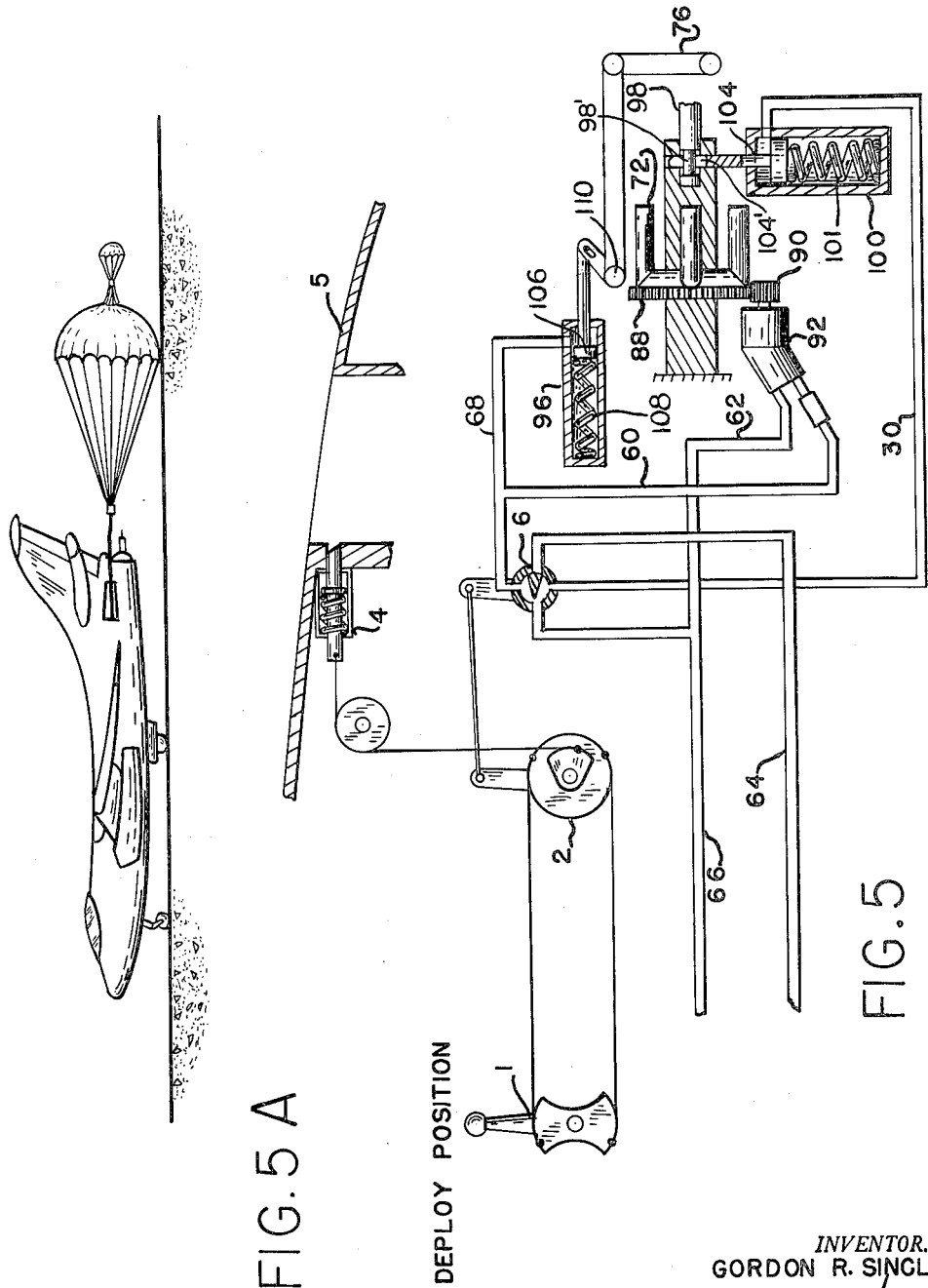
*INVENTOR.*
GORDON R. SINCLAIR
BY
Wade Toomey
Arnold H. Cole
ATTORNEYS

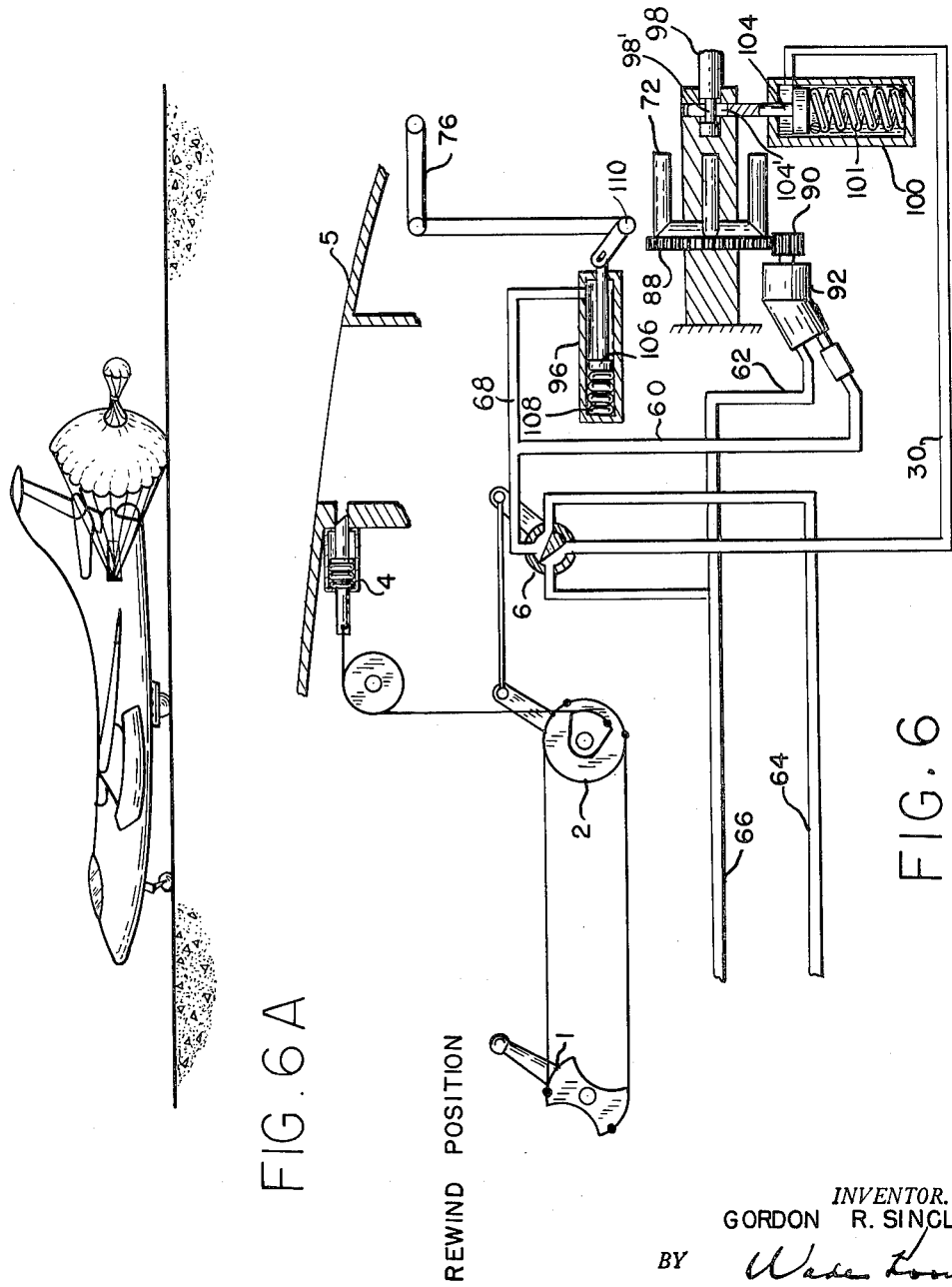

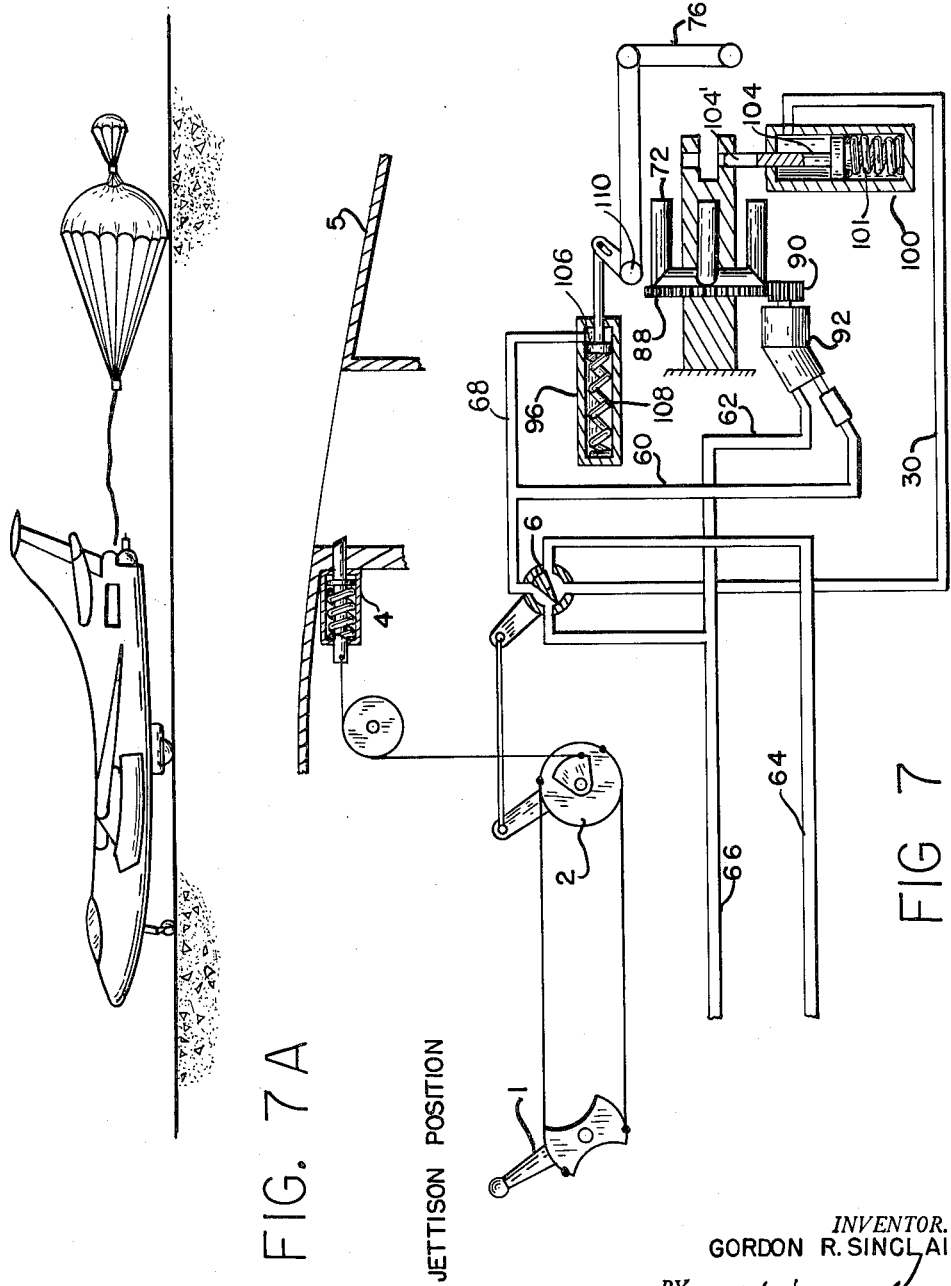

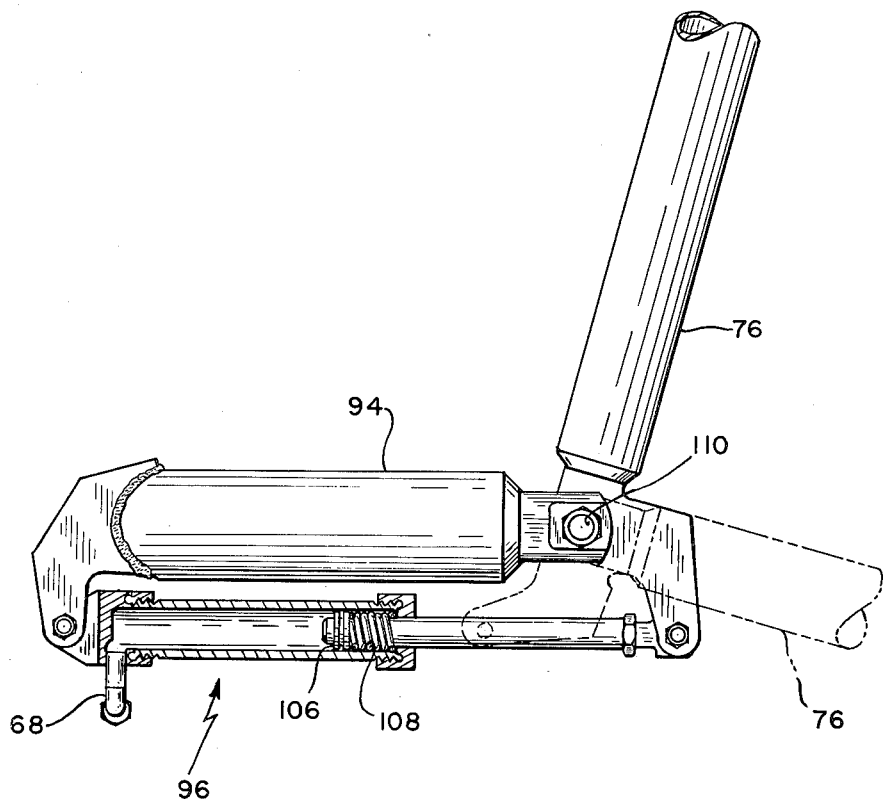

United States Patent Office 3,036,795
Patented May 29, 1962

3,036,795
DECELERATION PARACHUTE RETRACTION SYSTEM
Gordon R. Sinclair, Fallston, Md., assignor to the United States of America as represented by the Secretary of the Air Force
Filed Dec. 5, 1958, Ser. No. 778,548
1 Claim. (Cl. 244—113)

This invention relates to an improved means for retracting a deceleration or drag parachute now commonly used in landing a high speed airplane.

The jet plane has created problems in landing since it must touch the runway at speeds approaching or exceeding 160 knots. Such speeds, due to the configuration of the wings of the jet plane, require an excessively long runway or some external means to aid deceleration. It is common practice to provide such deceleration means by deploying a drag parachute behind the plane, which is effective to reduce the landing run by 30 to 40 percent. At present the drag chute is folded by hand and stowed in the rear fuselage of the plane. It is deployed as the plane touches the runway when the pilot releases a latch holding a door at the end of the parachute compartment. As soon as the momentum of the plane has been reduced to safe taxiing speed the drag chute is jettisoned or allowed to drag on the runway until the plane stops. If the chute is jettisoned at the predetermined speed it may blow about the runway and interfere with following aircraft. If it is not jettisoned it may interfere with parking operations and become entangled with the plane. In any event the chute may be damaged and must be recovered by a ground crew, inspected, repacked and restowed in the plane before it is ready for further use.

It is an object of this invention to provide a means and system for automatically retracting the chute into the fuselage of the plane by winding the riser, shrouds and canopy on a reel turned by a constant torque motor which is operated from the plane's hydraulic or pneumatic system.

The above and still other objects, advantages, and features of my invention will become apparent upon consideration of the following detailed description of one embodiment thereof, especially when taken in conjunction with the accompanying drawings, in which:

FIG. 4 is a schematic view showing the controls in normal position.

FIG. 5 is a schematic view showing the controls in the deploy position.

FIG. 6 is a schematic view showing the controls in rewind position;

FIG. 7 is a schematic view showing the controls in the jettison position; and

FIGS. 4A, 5A, 6A and 7A illustrate the various relative positions of the plane and the drag chute with the corresponding positions of the pilot's control handle; and FIG. 8 is a view, partly in section, showing the chute guide activating cylinder.

Figure 1:
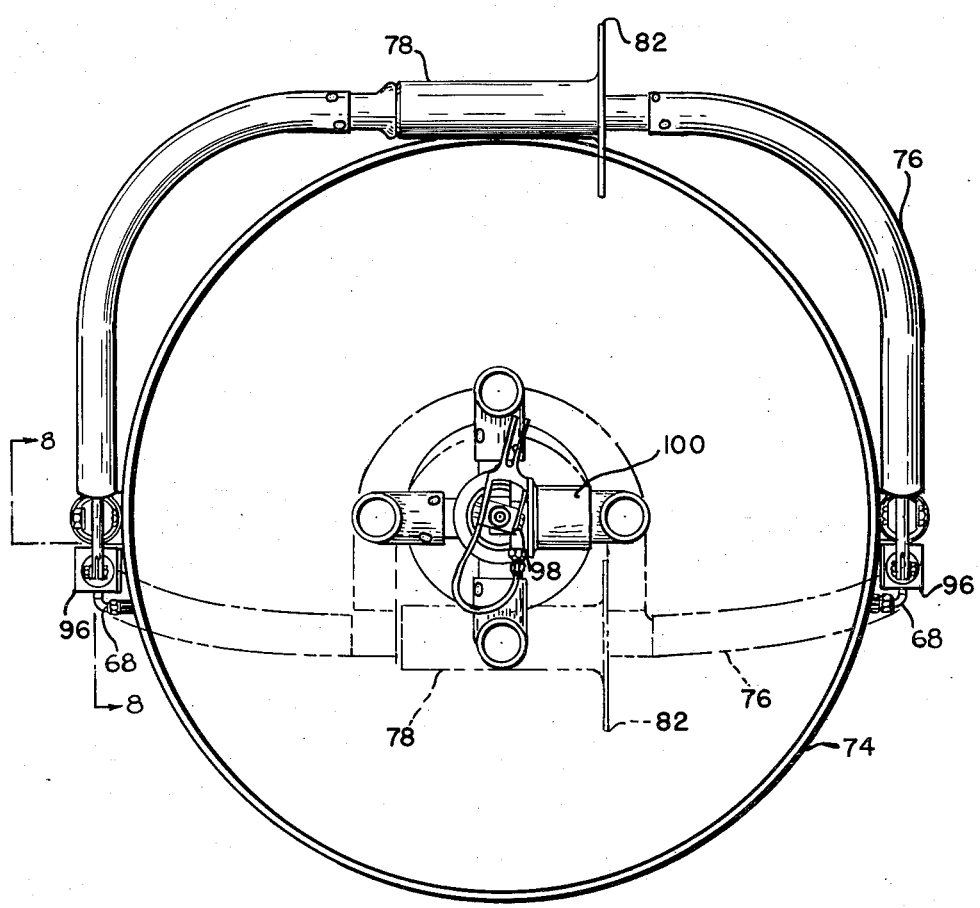
FIG. 1 is a view in end elevation of a preferred embodiment of this invention.
Figure 2:
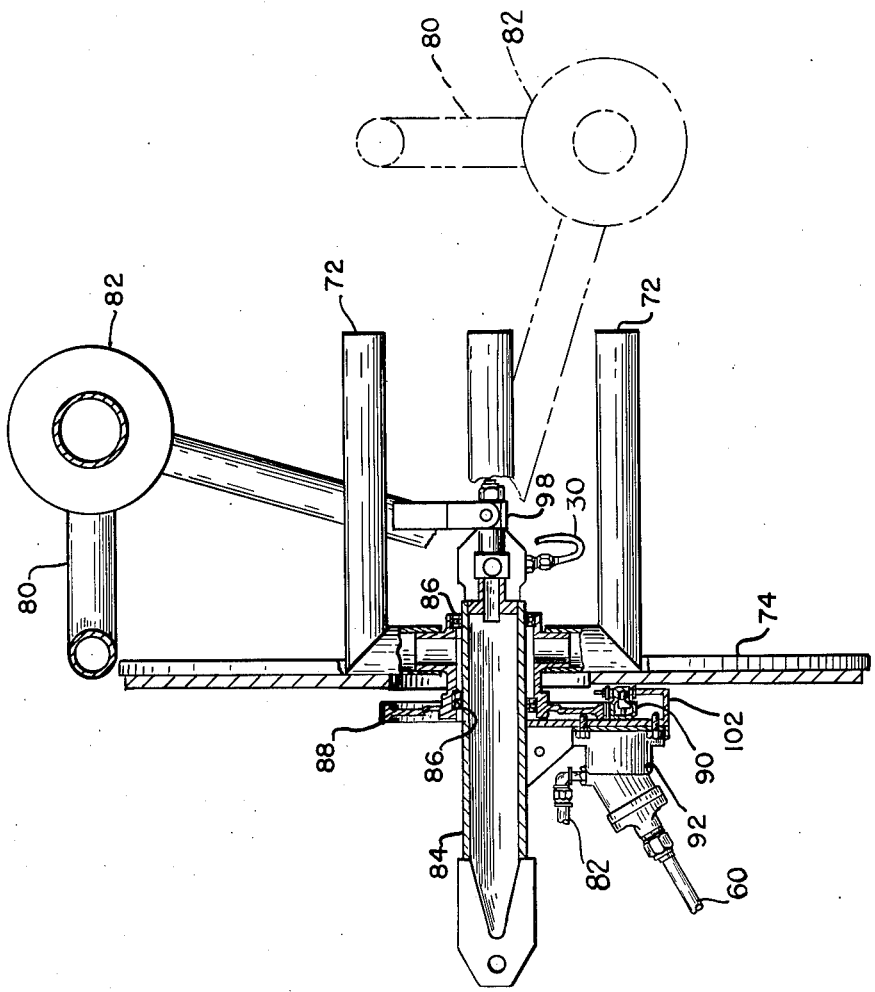
FIG. 2 is a view in side elevation and partly in section of the embodiment shown in FIG. 1.
Figure 3:
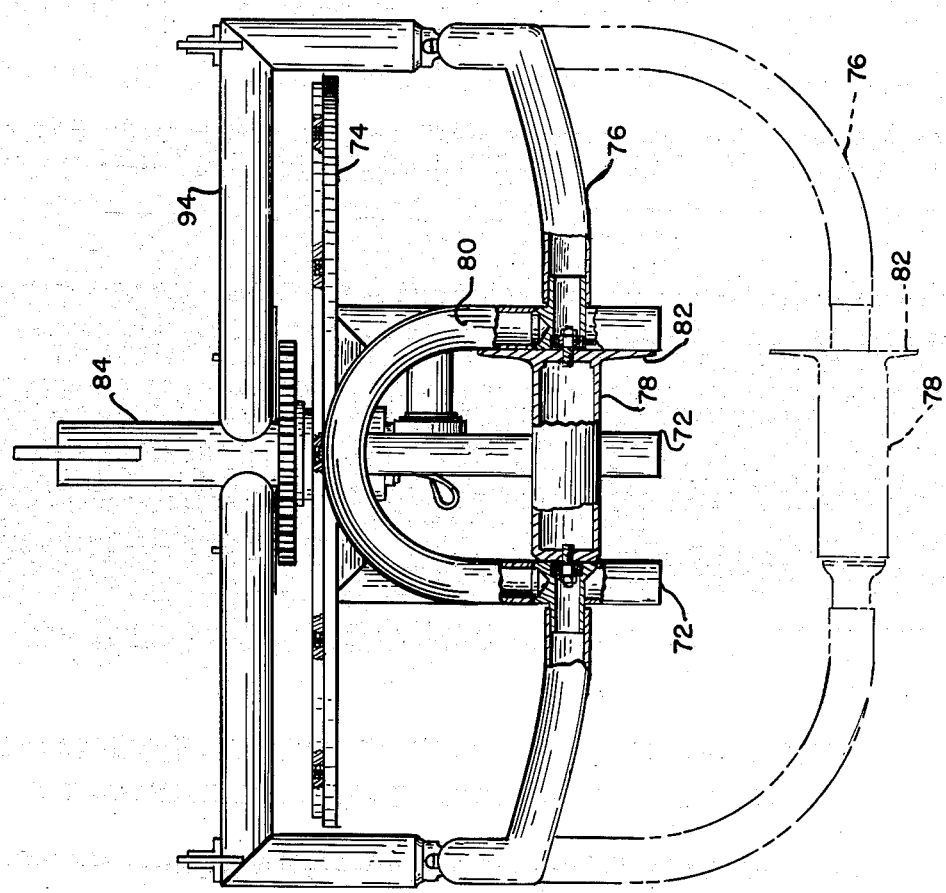
FIG. 3 is a plan view, partly in section of the embodiment shown in FIG. 1.

The key component of this system is a spinning reel 72; this is formed by attaching four L-shaped welded tubes to a central hub so as to form two U's with outstanding legs projecting aft; details of the construction and assembly are shown in FIG. 3, FIG. 2 and the end view looking forward FIG. 1.

The reel hub houses two ball bearings 86 mounted on a support tube 84. This tube will be designed to transmit the loads from the reel into the aircraft structure; details of the exact method of support will depend on the aircraft under consideration, and, for the purposes of this description, the assumption is made that adequate mounting for the support tube will be available.

A back flange 74 of the reel is a sheet metal disc, slightly dished at the edges and reinforced by light stiffeners running in a radial direction, attached to the reel hub. This flange restrains the parachute from sliding forward off the spinning reel.

A reel rewind drive gear 88 is also attached to the reel hub. This gear is driven by a small spur gear 90 mounted on the hydraulic rewind drive motor 92. This motor is of the constant torque type and is designed to operate on the pressure of the airplane hydraulic system to furnish a constant torque just sufficient to overcome the drag of the parachute when the speed of the plane has been reduced to a predetermined speed, ordinarily about 25 knots.

From the assembly drawing it is seen that when the motor is in operation the heel hub with all its attached parts, as described above, are rotated by the reel rewind drive gear 88.

During retraction of the deceleration parachute, the riser, shrouds and canopy are guided onto the spinning reel by a guide arm 76 which is shown in its rewind position by the heavy outlines. This is a large inverted U-shaped tubular member which rotates about pins in the lower ends of the side tubes. These pins attach the guide arm to a guide support structure 94; the latter consists of a tubular structure attached to the support tube 84.

Referring to the guide arm 76, assumed in the rewind position, it is seen that another small tubular U-shaped structure 80 is welded to the connecting tube of the guide arm in a plane approximately normal to the plane of 76; this is a guide ring 80. During rewind the parachute passes through this ring, which feeds it onto the reel 72.

Inside the guide ring the guide arm 76 is replaced by a roller 78, which is a tube rotating on ball bearings mounted in the ends of the guide arm; the purpose of this roller is to reduce friction on the parachute during rewind. A flange 82 is mounted on one end of the roller to avoid the possibility of the parachute wedging between the end of the roller and the guide ring during rewind; a flange at one end only is required because the reel motion tends to pull the parachute in one direction on the roller, as can be seen in FIG. 3.

The position of the guide arm for deployment of the parachute is shown by the light lines in the three views; during this operation it will be noted the guide ring 80 is in a vertical position, while the guide arm 76 is approximately horizontal. This position allows the parachute to spin freely off the reel and out through a chute tube, or conduit, (not shown) leading from a suitable housing containing the apparatus described herein to an opening in the skin of the airplane normally closed by a releasable door. The said housing is not shown, but is assumed to be connected to the frame of the plane in a suitable place in the fuselage.

The guide arm 76 is moved from its rewind position to its runout position by a chute guide actuating cylinder 96; hydraulic pressure must be maintained in this cylinder to hold the arm in the rewind position; when the pressure is released, the arm returns to the runout position. This is a safety feature, as it keeps the guide arm in position for deployment at all times, except when rewind is desired; even when the control lever is in "rewind" position, the arm cannot move up until the load in the riser is reduced to the retraction load at 25 knots, because the cylinder size limits the operating load to this condition.

The end of the parachute riser is connected by a suitable retaining pin 104 to a chute attachment fitting 98 to provide for positive engagement of the retaining pin when parachute deployment is desired and for automatic release of the parachute in case of an inadvertent deployment. Chute attachment fitting 98 has a groove 98' therearound in which a forked pin 104' fits, which is a part of piston 104, so that when the drum rotates, the said chute attachment fitting 98 rotates with it. Alternatively the riser may be attached to 98 in a groove thereon (not shown) to allow rotation of the riser with the reel 72 when the chute is being retracted.

The hydraulic motor 92 is mounted on a simple welded plate assembly 102 which is attached by welding to the support tube 84 and the guide arm 94.

The small drive gear is attached directly to the motor at its forward end and is supported by a ball bearing, housed in the motor mount, at the aft end. This small gear engages the reel rewind drive gear 88, which is mounted on the reel hub as previously described.

The control system is shown in FIGS. 4, 5, 6 and 7. In FIGURE 4, a pilot's handle 1 is shown in the normal position connected by a pair of conventional airplane cables to a control quadrant 2. The quadrant is connected by a similar cable to a door latch 4 and by a rigid bar to a four way valve 6. To this valve is connected a pressure line 64 from a suitable source of pressure and a return line 66. As seen in FIGURE 4, the pressure line 64 is connected through valve 6 to a line 30 running to chute retaining pin cylinder 100 which forces the piston in said cylinder against the pressure of a spring 101 and withdraws the riser retaining pin 104 from the chute attachment fitting 98. If in this position of the pilot's handle 1 the chute should be accidentally deployed, it would escape.

In FIGURE 5, the pilot's handle is shown in the deploy position. The movement of the control quadrant 2 had opened the latch 4, allowing door 3 to be forced open by the pressure of a folded pilot chute (not shown), and at the same time so positioned valve 6 that pressure is cut off from the motor 92, the chute guide actuating cylinder 96 and the chute retaining pin cylinder 100. Spring 101 then forces riser retaining pin 104 into engagement with chute attachment fitting 98. The chute is free to spin, or peel off, the reel 72 and is deployed for retarding the speed of the plane.

In FIGURE 6, the pilot's control handle is in the rewind position. The control quadrant 2 has been moved so as to position valve 6 to admit pressure to motor 92 through line 60 and to chute guide actuating cylinder 96 through line 68. This action starts the motor 92 and at the same time raises guide arm 76 to the upright, or rewind position by admitting pressure to cylinder 96. The action of cylinder 96 is best seen in FIGURE 8. A piston 106 is shown biased by spring 108. With pressure admitted through line 68 to the cylinder 96, the piston is moved against the pressure of said spring and forces the guide arm 76 up, which is pivoted at 110 to the support structure 94. When the pressure is released, as it is in the normal position, FIGURE 4, the deploy position, FIGURE 5, and the jettison position, FIGURE 7, the spring 108 and the force of gravity return the said guide arm 76 to the down, or runout position.

FIGURE 7 is the same as normal position.

The great advantage of this retraction system is that no parts of the mechanism move during deployment; the parachute merely spins off the reel. In this way no inertia forces, which must later be dissipated, are created.

It is to be understood that the above-described arrangement is merely illustrative of the applications of the principles of the invention. Numerous other arrangements may be devised by those skilled in the art without departing from the spirit and scope of the invention.

What is claimed is:

In an automatic parachute retraction system secured to the inside of the fuselage of an airplane, an opening in said fuselage, releasable means normally closing said opening, a reel mounted within said fuselage and arranged to rotate on an axis substantially parallel to the axis of said airplane, means on said reel for releasably securing a parachute to said reel, a guide member pivotally supported within said fuselage to permit said parachute to be removed from said reel in an axial direction in one position and rotatable to a position to guide said parachute onto said reel to permit said parachute to be wound on said reel to retract said parachute, a constant torque motor secured to said fuselage, a train of reduction gears connected to said motor for driving said reel, manually controlled fluid means arranged to drive said motor, a cylinder connected to said fluid means to raise said guide member to guide said parachute on to said reel to retract said parachute, the torque of said motor and the force applied to said guide member being sufficient to automatically turn said motor and to raise said guide member against the pull of the parachute when the speed of the plane has been reduced to predetermined speed.

References Cited in the file of this patent

UNITED STATES PATENTS

| | | |
|---|---|---|
| 1,972,967 | Zahodiakin | Sept. 11, 1934 |
| 2,513,867 | Heffernan | July 4, 1950 |
| 2,590,369 | Beeler | Mar. 25, 1952 |
| 2,709,054 | Roth | May 24, 1955 |